(12) United States Patent
Kanbe

(10) Patent No.: US 7,525,721 B2
(45) Date of Patent: Apr. 28, 2009

(54) CHARGED PARTICLE, MICROCAPSULE, ELECTROPHORETIC DEVICE, ELECTRO-OPTICAL DEVICE, AND METHOD OF FORMING A MICROCAPSULE

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 577 days.

(21) Appl. No.: 11/322,288

(22) Filed: Jan. 3, 2006

(65) Prior Publication Data
US 2006/0187526 A1     Aug. 24, 2006

(30) Foreign Application Priority Data
Feb. 24, 2005     (JP)     ............... 2005-049299

(51) Int. Cl.
G02B 26/00     (2006.01)
G02F 1/133     (2006.01)
G09G 3/34     (2006.01)

(52) U.S. Cl. .............. 359/296; 349/33; 345/107

(58) Field of Classification Search ............... 359/296, 359/245, 253–254, 265, 290–291; 430/31–32; 345/107; 349/33
See application file for complete search history.

(56) References Cited

U.S. PATENT DOCUMENTS 6,741,387 B2 * 5/2004 Shigehiro et al. .......... 359/296
2005/0267235 A1 * 12/2005 Minami ..................... 523/201

FOREIGN PATENT DOCUMENTS

JP     A 2001-056653     2/2001
JP     A 2004-037507     2/2004

* cited by examiner

Primary Examiner—Scott J Sugarman
Assistant Examiner—Dawayne A Pinkney
(74) Attorney, Agent, or Firm—Oliff & Berridge, PLC

(57) ABSTRACT

Titania particles including charged particles that are used in an electrophoretic device, wherein surfaces of the particles are finished using a surface finishing agent containing a composition having a single reactive group so that the composition bonds to the particles at the reactive group of the composition.

7 Claims, 3 Drawing Sheets

CHARGED PARTICLE, MICROCAPSULE, ELECTROPHORETIC DEVICE, ELECTRO-OPTICAL DEVICE, AND METHOD OF FORMING A MICROCAPSULE

BACKGROUND

1. Technical Field

The present invention relates to an electrophoretic display technique for changing visual condition by controlling electric field application to charged particles, especially titania particles that are suitable as charged particles, as well as a method for making such particles.

2. Related Art

There has been an electrophoretic solution used in an electrophoretic display device wherein two kinds of dispersed particles having different colors and different charging polarities are dispersed in a colorless dispersion medium. When such two kinds of dispersed particles having different electrification charges are dispersed in one dispersion medium, the complete prevention of cohesion between particles is difficult. However, for the purpose of improving dispersibility, surface finishing is performed using a surface finishing agent.

As such a surface finishing agent, general surface finishing agents have been used. JP-A-2001-56653 (Paragraph 0026, etc.) is an example of related art. In the related art example, a multifunctional surface finishing agent having a plurality of functional groups that react with hydroxyl groups existing on the surfaces of dispersed particles has been used, without giving any special consideration on the number of functional groups, etc. contained in the surface finishing agent. If the reaction of all functional groups contained in the surface finishing agent is completed successfully by performing surface finishing of dispersed particles using such a multifunctional surface finishing agent, the surface finishing agent works as stable agent with more number of bonding groups. Therefore, such a surface finishing agent has been considered preferable for making charged particles to be used in an electrophoretic display device.

In the case of using the above multifunctional surface finishing agent, however, a problem has frequently occurred that some of the functional groups fail to react and remain as unreacted functional groups or turn into other types of functional groups. The use of dispersed particles that are made under such circumstances in an electrophoretic display solution has caused troubles. For example, dispersed particles having unreacted groups, react with each other, or dispersed particles having unreacted hydroxyl groups and other dispersed particles having other unreacted groups react with each other in a dispersion medium. Such troubles tend to cause cohesion. In case of such cohesion, the size of particles becomes larger. As a result, displayed images become rougher or the cohered particles are fixed on the substrate.

SUMMARY

An advantage of the invention is to provide titania particles, a method for making an electrophoretic display solution, a microcapsule and an electrooptic device wherein display performance of high contrast can be achieved by employing a surface finishing method that hardly causes cohesion between dispersed particles after surface finishing, without causing any color mixture due to cohesion.

The applicant of the invention has developed a surface finishing method that does not cause the above problem even when titania (titanium dioxide) is used as dispersed particles. In an experiment of the surface finishing method, the inventor has obtained the most preferable result. That is, according to a first aspect of the invention, titania particles include charged particles that are used in an electrophoretic device, wherein the surfaces of the particles are finished using a surface finishing agent containing a composition having a single reactive group so that the composition bonds to the particles at the reactive group of the composition.

Titania particle is a common name of quaternary titanium oxide. Titania particles, which are normally white, can configure an electrophoretic solution wherein the color of the solution varies in accordance with the electric field applied when dispersed in a dispersion medium together with other particles such as acrylic particles, for example, that have a different color and a different charging polarity. When the surfaces of titania particles are finished with a surface finishing agent, the titania particles react and bond with the functional group (reactive group) included in a composition contained in the surface finishing agent and are put into a state of molecules that can be dispersed in a dispersion medium. Under such circumstances, when the composition that is contained in the surface finishing agent is multifunctional, there have been some cases where functional groups, such as hydroxyl groups, etc., having a strong polarity remain on the surface-finished titania particles. Such titania particles react with other titania particles that have remaining hydroxyl groups in a dispersion medium and, as a result, cause cohesion, leading to the precipitation of particles and the degradation of contrast.

According to the first aspect of the invention, since surface finishing is performed using a surface finishing agent containing a composition having a single reactive group, the single reactive group of each composition molecule in the surface finishing agent bonds with titania. Since the bonded composition molecule has no more functional groups, there is no more reaction with other titania particles. Therefore, the surface of each titania particle is uniformly covered with the above composition molecules without causing cohesion between particles. Hence, titania particles that are finished with a surface finishing agent containing such a composition have a surface to which composition molecules are bonded at each functional group. Such titania particles, which are electrically neutral, can be dispersed stably in a dispersion medium.

To be more specific, according to a second aspect of the invention, titania particles that are finished with the above special surface finishing agent are titania particles including charged particles, to which a composition that includes R1, R2 and R3 as alkyl groups and R0 as a single functional group in a chemical formula below is bonded by the substitution of R0.

Chemical formula 1:

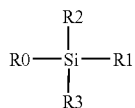

Further, according to a third aspect of the invention, titania particles having chlorine, which is well reactive, as a functional group are titania particles including charged particles, to which a composition that includes R1, R2 and R3 as alkyl groups and Cl in a chemical formula below is bonded by the substitution of Cl.

Chemical formula 2:

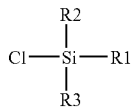

Furthermore, according to a fourth aspect of the invention, a method for making an electrophoretic solution that is used in an electrophoretic device include: a) finishing the surfaces of titania particles using a surface finishing agent containing a composition having a single reactive group; and b) agitating the surface-finished titania particles in a dispersion liquid.

By the above method, titania particles bond with the composition at the reactive group in the step (a). Therefore, the surface-finished titania particles to which composition molecules are uniformly bonded can be obtained. The titania particles are preferably charged negative when agitated in a dispersion medium in the step (b).

In the fourth aspect of the invention, it is preferable to further include (a-1) removing the composition having an unreacted group by agitating the surface-finished titania particles in a solvent, after the surface finishing in the step (a). With the step (a-1), the composition molecules having a remaining unreacted functional group are precipitated and removed by agitating the surface-finished titania particles in a solvent. Therefore, the rate of unreacted groups in the titania particles can be reduced largely. By the above method, titania particles that hardly cause cohesion in an electrophoretic solution can be obtained.

In the fourth aspect of the invention, it is preferable to further include (b-1) heating the dispersion liquid by introducing air into the dispersion liquid, during the agitation in a dispersion liquid in the step (b). Due to the heating process under an air atmosphere in the step (b-1), the negative charging of titania particles is more ensured.

Under such circumstances, the surface finishing agent that is used in the above step is a surface finishing agent that contains a composition including R1, R2 and R3 as alkyl groups and R0 as a single functional group in a chemical formula below.

Chemical formula 3:

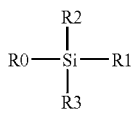

Further, the surface finishing agent that is used in the above step is a surface finishing agent that contains a composition including R1, R2 and R3 as alkyl groups in a chemical formula below.

Chemical formula 4:

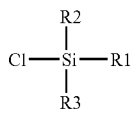

To be more specific, the surface finishing agent is any one coupling agent that is selected from a group including: a silane series coupling agent, a titanate series coupling agent, a chromium series coupling agent, an aluminum series coupling agent and a germanium series coupling agent.

Further, the preferable silane series coupling agent according to the fourth aspect of the invention contains one composition that is selected from a group including: acetoxyethyldimethylchlorosilane, n-butyldimethylchlorosilane, t-butyldiphenylchlorosilane, 10-(carboxy) decyldimethylchlorosilane, 3-chloropropyldimethylchlorosilane, 2-(3-dicyclohexyl)ethyldimethylchlorosilane, cyclohexyldimethylchlorosilane, di-t-butylchlorosilane, diphenylmethylchlorosilane, dodecyldimethylchlorosilane, heptadecafluoro-1,1,2,2-tetrahydrodecyldimethylchlorosilane, n-octadecyldimethylchlorosilane, n-octadecyldimethylmethoxysilane, n-octyldimethylchlorosilane, pentafluorophenylpropyldimethylchlorosilane, phenethyldimethylchlorosilane, phenoxydimethylchlorosilane, phenyldimethylethoxysilane, tribenzylchlorosilane and 1,1,2,2-perphlorodecyldimethylchlorosilane. Since the above compositions have only a single reactive group, the above-described problem can be solved.

Furthermore, the preferable germanium series coupling agent according to the fourth aspect of the invention contains one composition that is selected from a group including: t-butyldimethylchlorogermane, phenyldimethylchlorogermane, tri-n-butylchlorogermane, triethylmethoxygermane and triphenylgermane. Since the above compositions have only a single reactive group, the above-described problem can be solved.

According to a fifth aspect of the invention, an electrophoretic solution includes the titania particles that are finished as above dispersed in the electrophoretic solution. Further, according to a sixth aspect of the invention, a microcapsule includes the electrophoretic solution according to the fifth aspect of the invention. Furthermore, according to a seventh aspect of the invention, an electrooptic device includes the microcapsule according to the sixth aspect of the invention.

In the above description, the word "electrooptic device" mentions general devices that utilizes a phenomenon that is caused when charged particles such as titania particles, etc. included in an electrophoretic solution are electrically moved by an electric field applied. The device includes electronic papers, clocks, calculators, cellular phones, personal digital assistants, etc. Especially, the device includes electrophoretic display devices that utilize the visual change of colors accompanied by the migration of charged particles. As long as an electrophoretic solution is used, things that are hardly considered as a device, such as paper/film-like things having flexibility, as well as things that belong to real estate including walls, etc. and movable bodies including vehicles, flight vehicles, vessels, etc. having such flexible things on, for example, are also included.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will now be described with reference to the accompanying drawings.

The following embodiment is only an example and the invention can be modified variously within the scope of the invention.

Figure 1:
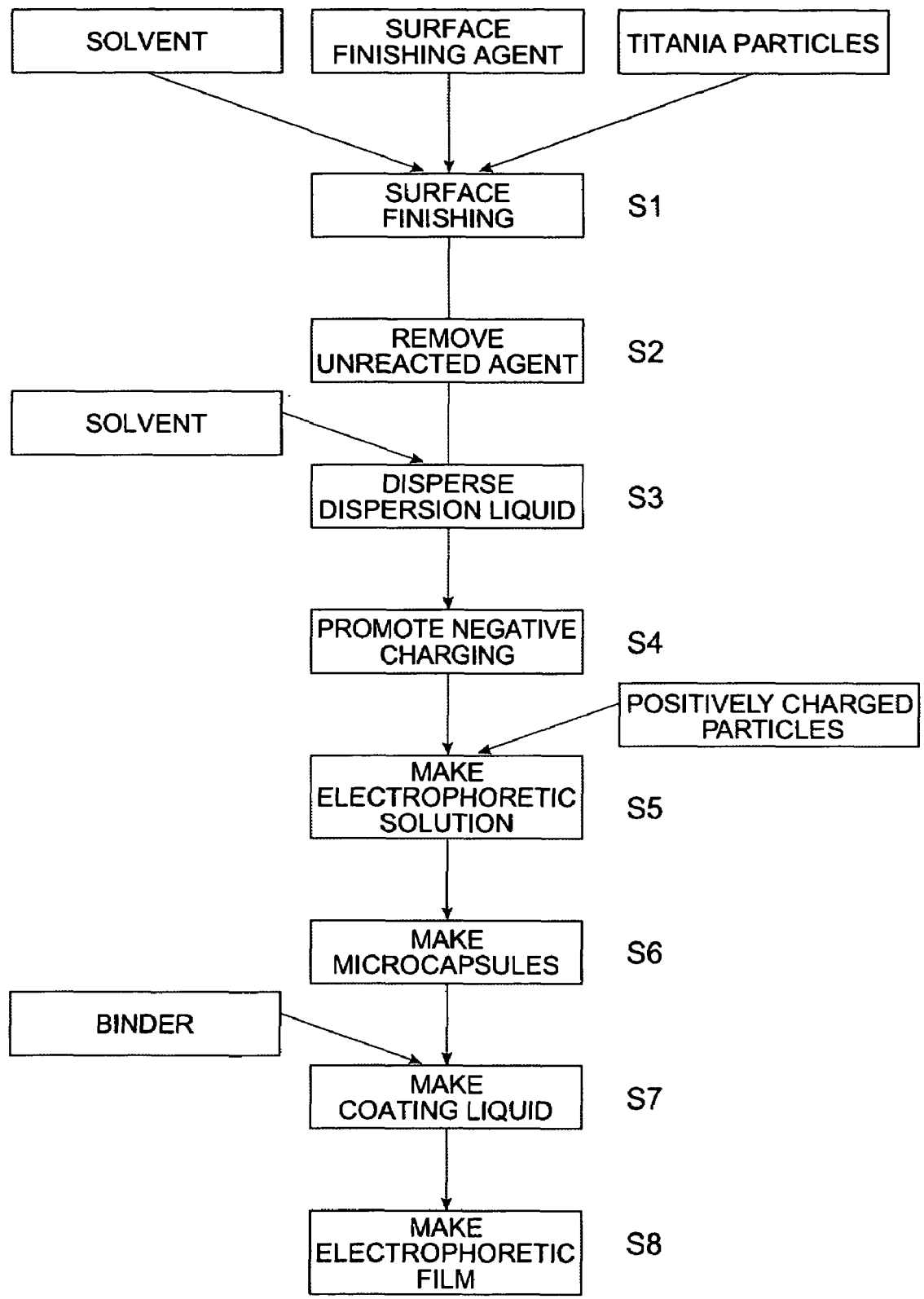
FIG. 1 is a flow chart describing a method for making an electrophoretic solution according to an embodiment of the invention.

A flow chart describing a method for making an electrophoretic solution according to an embodiment of the invention is shown in FIG. 1. The flow chart is only an example and the embodiment of the invention is not limited to the following.

As shown in FIG. 1, the embodiment of the invention is a method for making an electrophoretic solution and roughly includes: 1) a step for finishing the surfaces of titania particles with a surface finishing agent containing a composition having a single reactive group (S1); 2) a step for removing the above composition having an unreacted group by agitating the surface-finished titania particles in a solvent (S2); 3) a step for agitating the surface-finished titania particles in a dispersion medium (S3); and 4) a step for heating the dispersion liquid by introducing air into the dispersion liquid. By applying various publicly known techniques relating to the making of an electrophoretic solution to the above steps, a practically preferable electrophoretic solution will be made. Now, each of the steps will be described in detail.

(1) Surface Finishing (S1)

In a step S1 shown in FIG. 1, titania particles are finished using a surface finishing agent containing a composition having a single reactive group. As a method for applying the surface finishing agent, wet processing, dry processing and spray processing can be employed. As a particle processing method, direct processing, masterbatch processing and dry concentration can be employed. The embodiment describes the case of wet processing.

Titania particle is quaternary titanium oxide ($TiO_2$). Titania particles are made by precipitating and separating hydroxide from a titanium salt solution. In order to make the titania particles as electrophoretic particles, the particles are shaped in a size suitable for dispersion as electrophoretic particles after the surface finishing step.

As an average particle size, 0.01 to 100 μm is suitable. In order to achieve longer migration, 0.01 to 10 μm is more preferable. It is convenient to use marketed titania particles from the practical viewpoint. For example, the TTO series, ET series, ST/STS series, etc. from Ishihara Sangyo Kaisha, Ltd. can be used. As highly dispersible titania particles, CR-90, R-930, R-680, etc. are preferable.

It is also preferable to use a solvent wherein titania particles can preferably be dispersed. The same solvent as a dispersion medium for an electrophoretic solution, which will be described later, can be used. The solvent needs to have: a low solubility for both titania particles and the other kind of particles that are used in pair with titania particles; and a molecule quantity suitable for both kinds of charged particles to be under migration. The candidates of the solvent include: alkylbenzene derivatives such as benzene, toluene, xylene, ethylbenzene, dodecylbenzene, etc.; diallylalkane derivatives such as phenylxylylethane, 1,1-ditolylethane, 1,2-ditolylethane, 1,2-bis (3,4-dimethylphenylethane) (BDMF), etc.; alkylnaphthalene derivatives such as diisopropylnaphthalene, etc.; alkylbiphenyl derivatives such as monoisopropylbiphenyl, isopropylbiphenyl, isoamylbiphenyl, etc.; terphenyl derivatives that are hydrogenized at various ratios; triallyldimethane derivatives such as dibenzyltoluene, etc.; benzylnaphthalene derivatives; phenyleneoxide derivatives; diallylalkylene derivatives; allylindane derivatives; polychlorinated biphenyl derivatives; naphthenic hydrocarbon; etc.

Further, the following are also included: aliphatic hydrocarbons such as hexane, cyclohexane, kerosene, Isopar, paraffinic hydrocarbon, etc.; halogenated hydrocarbons such as chloroform, trichloroethylene, tetrachloroethylene, trifluoroethylene, tetrafluoroethylene, dichloromethane, ethyl bromide, etc.; phosphoric esters such as tricresyl phosphate, trioctyl phosphate, octyldiphenyl phosphate, tricyclohexyl phosphate, etc.; phthalate esters such as dibutyl phthalate, dioctyl phthalate, dilauryl phthalate, dicyclohexyl phthalate, etc.; carboxylate esters such as butyl oleate, diethylene glycol dibenzoate, dioctyl sebacate, dibutyl sebacate, dioctyl adipate, trioctyl trimellitate, acetyltriethyl citrate, octyl maleate, dibutyl maleate, ethyl acetate, etc.; chlorinated paraffin; N,N-dibutyl-2-butoxy-5-tertiaryoctylaniline; etc. Further, the above dispersion mediums can be used individually or as a mixture of two or more kinds. In addition, the solvents suitable for the embodiment of the invention are not limited to the above examples.

The surface finishing agent needs to contain a composition having only a single reactive group. For example, a surface finishing agent including R1, R2 and R3 as alkyl groups and R0 as a single functional group in a chemical formula below is applicable.

Chemical formula 5:

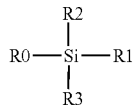

Also, the surface finishing agent used in the above step is a surface finishing agent that contains a composition including R1, R2 and R3 as alkyl groups in a chemical formula below.

Chemical formula 6:

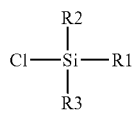

To be more specific, the surface finishing agent can be selected from a group including: a silane series coupling agent, a titanate series coupling agent, a chromium series coupling agent, an aluminum series coupling agent and a germanium series coupling agent.

The silane series coupling agent can be selected from: acetoxyethyldimethylchlorosilane, n-butyldimethylchlorosilane, t-butyldiphenylchlorosilane, 10-(carboxy) decyldimethylchlorosilane, 3-chloropropyldimethylchlorosilane, 2-(3-dicyclohexyl)ethyldimethylchlorosilane, cyclohexyldimethylchlorosilane, di-t-butylchlorosilane, diphenylmethylchlorosilane, dodecyldimethylchlorosilane, heptadecafluoro-1,1,2,2-tetrahydrodecyldimethylchlorosilane, n-octadecyldimethylchlorosilane, n-octadecyldimethylmethoxysilane, n-octyldimethylchlorosilane, pentafluorophenylpropyldimethylchlorosilane, phenethyldimethylchlorosilane, phenoxydimethylchlorosilane, phenyldimethylethoxysilane, tribenzylchlorosilane and 1,1,2,2-perphlorodecyldimethylchlorosilane. From the above materials, two or more can also be selected.

Furthermore, the germanium series coupling agent applicable to the embodiment of the invention includes: t-butyldimethylchlorogermane, phenyldimethylchlorogermane, tri-n-butylchlorogermane, triethylmethoxygermane and triphenylgermane. From the above materials, two or more can also be selected.

After adding the above surface finishing agent and titania particles into a solvent selected from above, the mixture is agitated at a temperature suitable for promoting surface finishing, which is 30 to 80 degrees Celsius for example or more preferably 40 to 70 degrees Celsius, for a sufficient period of time suitable for the progress of surface finishing, which is 1 to 6 hours for example or more preferably 2 to 4 hours.

During the agitation, one functional group of the composition included in the surface finishing agent reacts with titania to create a state where the composition is uniformly bonded to the surfaces of titania particles. After the agitation, a process for separating titania particles from the solvent, such as centrifugal separation, etc. for example, is performed to extract the surface-finished titania particles.

(2) Remove Unreacted Agent (S2)

Figure 2:
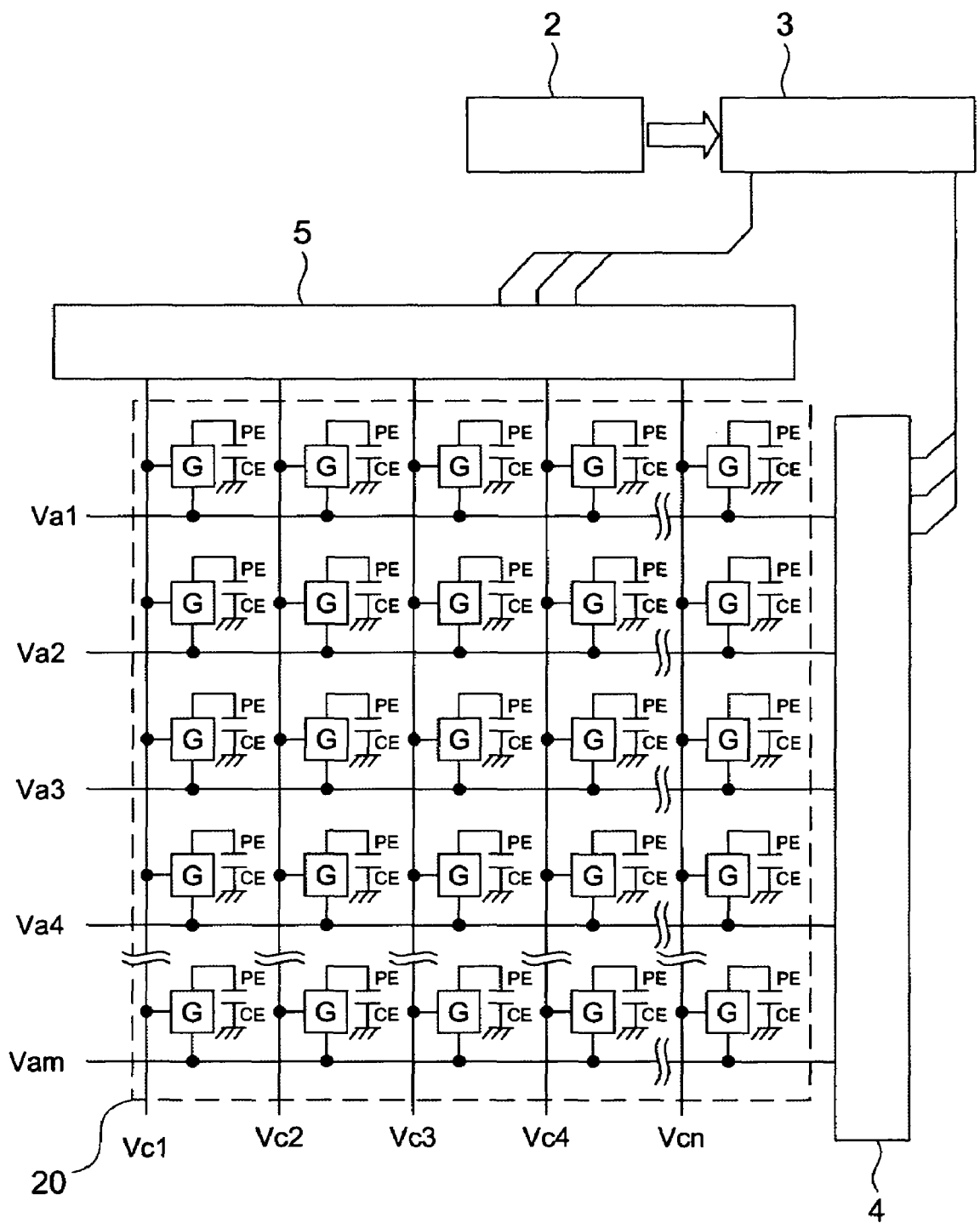
FIG. 2 is a block diagram of an electrophoretic device.

As shown in a step S2 in FIG. 2, by agitating the surface-finished titania particles again in the solvent, the composition molecules having an unreacted group are removed by cleansing. The cleansing step is an optional step and not necessary if there remain almost no composition molecules having an unreacted functional group after the sufficient progress of surface finishing in the step S1.

Again, a solvent is added to the titania particles separated from the solvent after surface finishing and the mixture is agitated. The time for agitation is approximately 0.5 to 2 hours. Then, titania particles are separated again from the solvent in the same manner as in the surface finishing step. The type of the solvent and the method for separating the titania particles from the solvent can be considered the same as those in the step S1.

In the above surface finishing step, it is ideal that all the functional groups contained in the surface finishing agent react and bond to the titania surfaces after the long-time agitation. In some cases, however, some of the functional groups remain unreacted. If an electrophoretic solution is made including a surface finishing agent containing such unreacted groups, cohesion sometimes occurs after microcapsules are completed. Hence, in the step S2, composition molecules having a remaining unreacted functional group are precipitated and removed by further agitating the surface-finished titania particles in a solvent. Therefore, the rate of unreacted groups included in the titania particles can be reduced largely. By the above method, titania particles that hardly cause cohesion in an electrophoretic solution can be obtained.

The titania particles that are finished with such a surface finishing agent are titania particles as charged particles, to which a composition that includes R1, R2 and R3 as alkyl groups and R0 as a single functional group in a chemical formula below is bonded by the substitution of R0.

Chemical formula 7:

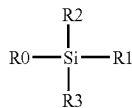

Further, titania particles having chlorine, which is well reactive, as a functional group are titania particles as charged particles, to which a composition that includes R1, R2 and R3 as alkyl groups and Cl in a chemical formula below is bonded by the substitution of Cl.

Chemical formula 8:

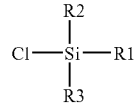

(3) Disperse Dispersion Liquid (S3)

As shown in a step S3 in FIG. 1, the surface-finished titania particles are agitated in a dispersion medium. As a dispersion medium, the same one as the above solvent can be applied. Since the dispersion medium is used for finalizing the color of an electrophoretic solution, dyes can be dissolved considering the color of dispersed particles. As such dyes, various oil-soluble dyes can be applied. Typical examples include: spirit black (SB, SSBB and AB), nigrosine base (SA, SAP, SAPL, EE, EEL, EX, EXBP and EB), oil yellow (105, 107, 129, 3G and GGS), oil orange (201, PS and PR), fast orange, oil red (5B, RR and OG), oil scarlet, oil pink 312, oil violet #730, Macrolex blue RR, Sumiplast green G, oil brown (GR and 416), sudan black X60, oil green (502 and BG), oil blue (613, 2N and BOS), oil black (HBB, 860 and BS), Valifast yellow (1101, 1105, 3108 and 4120), Valifast orange (3209 and 3210), Valifast red (1306, 1355, 2303, 3304, 3306 and 3320), Valifast pink 2310N, Valifast brown (2402 and 3405), Valifast blue (3405, 1501, 1603, 1605, 1607, 2606 and 2610), Valifast violet (1701 and 1702), Valifast black (1802, 1807, 3804, 3810, 3820 and 3830), etc. However, applicable dyes are not limited to the above.

Further, in the electrophoretic solution according to the embodiment of the invention, various supplementary ingredients that are frequently used for enhancing the dispersibility of charged particles in a dispersion medium can be added. Such supplementary ingredients include, but are not limited to, publicly known surfactants, protective colloids, etc.

By the way, dispersion is performed for a time period and at a temperature that are suitable for dried titania particles to be sufficiently redispersed in a dispersion medium and charged negative during the agitation step. For example, agitation needs to be continued for 10 to 60 minutes or, for more sufficient negative charging, 30 to 60 minutes. The temperature for agitation needs to be set to room temperature to 60 degrees Celsius or, for more sufficient negative charging, room temperature to 55 degrees Celsius. The titania particles finished as above tend to be spontaneously charged negative. In the case of using a fluorinated surface finishing agent such as 1,1,2,2-perphlorodecyldimethylchlorosilane, for example, titania particles are almost preferably charged negative after surface finishing.

However, the negative charging of titania particles is not always sufficient depending on the type of the surface finishing agent or the conditions for dispersion. In such a case, another step for promoting negative charging is performed as follows.

Promote Negative Charging (S4)

As shown in a step S4 in FIG. 1, in order to promote negative charging, heating is performed by introducing air into the dispersion medium where the surface-finished titania particles are dispersed. As described above, since titania particles can be charged negative in the dispersion step depending on the type of the surface finishing agent used, the heating step is an optional step that can be applied in accordance with the charging condition of titania particles.

Air is introduced into the dispersion medium. The time for air introduction is 1 to 4 hours. For more sufficient negative charging, the dispersion medium needs to be agitated up to 4 hours. The temperature for agitation is set to 70 or higher degrees Celsius or, for more sufficient negative charging, 150 to 300 degrees Celsius. With such an agitation step, sufficient negative charging of titania particles can be ensured.

By the above method, a dispersion medium wherein titania particles that are charged negative and cause less cohesion are dispersed can be obtained, which characterizes the embodiment of the invention.

(5) Make Electrophoretic Solution (S5)

As shown in a step S5 in FIG. 1, positively charged dispersed particles, which are the other kind of charged particles that are charged positive, are mixed into the dispersion liquid wherein the negatively charged titania particles are under migration.

As positively charged dispersed particles, colored or contrasting-colored (white) organic or inorganic pigment particles having a different color from titania particles can be used. It is preferable that the dispersed particles have, the same as titania particles, a low solubility to the dispersion medium used and can maintain a preferable dispersion state. The positively charged dispersed particles that are selected to be used in pair with negatively charged titania particles are not used individually but determined based on the relation with titania particles. That is, the type of positively charged particles is determined so that the relation among mobility, particle size and density in a dispersion medium becomes suitable for titania particles. Such particles are dispersed in a quantity that is determined in relation to the dispersed quantity of titania particles.

Such dispersed particles include, as organic pigment particles for example: desirably colored acrylic particles, fast yellow, disazo yellow, condensed azo yellow, anthrapyrimidine yellow, isoindoline yellow, copper azomethine yellow, quinophthalo yellow, benzimidazolone yellow, nickel dioxime yellow, monoazo yellow lake, dinitroaniline orange, pyrazolone orange, perinone orange, naphthol red, toluidine red, permanent carmine, brilliant fast scarlet, pyrazolone red, rhodamine 6G lake, permanent red, lithol red, bon lake red, lake red, brilliant carmine, Bordeaux 10B, naphthol red, quinacridone magenta, condensed azo red, naphthol carmine, perylene scarlet, condensed azo scarlet, benzimidazolone carmine, anthraquinonyl red, perylene red, perylene maroon, quinacridone maroon, quinacridone scarlet, quinacridone red, diketopyrrolopyrrole red, benzimidazolone brown, phthalocyanine green, victoria blue lake, phthalocyanine blue, fast sky blue, alkali blue toner, indanthrone blue, rhodamine B lake, methyl violet lake, dioxazine violet, and naphthol violet.

Further, applicable inorganic pigment particles include: white lead, zinc oxide, lithopone, titanium dioxide, zinc sulfide, antimony oxide, calcium carbonate, kaolin, mica, barium sulfate, gloss white, alumina white, talc, silica, calcium silicate, cadmium yellow, cadmium lithopone yellow, yellow iron oxide, titan yellow, titan barium yellow, cadmium orange, cadmium lithopone orange, molybdate orange, red ocher, red lead, vermilion, cadmium red, cadmium lithopone red, amber, brown iron oxide, galvanized iron chromium brown, chromium green, chromium oxide, viridian, cobalt green, cobalt chromium green, titan cobalt green, iron blue, cobalt blue, ultramarine blue, cerulean blue, cobalt aluminum chromium blue, cobalt violet, mineral violet, carbon black, iron black, manganese ferrite black, cobalt ferrite black, copper chromium black, copper chromium manganese black, black low-level titanium oxide (titanium black), aluminum powder, copper powder, lead powder, tin powder, zinc powder, etc.

Into a dispersion liquid wherein the above-described titania particles are dispersed, positively charged dispersed particles are added in an appropriate quantity determined in accordance with the mixed quantity. Further, the above-described dispersion medium is also added in accordance with need. Then, the mixture is agitated so that both kinds of dispersed particles are sufficiently dispersed. The agitation is promoted by applying an ultrasonic wave to the dispersion medium, in accordance with need. By the above method, an electrophoretic solution wherein two different kinds of charged dispersed particles are dispersed can be made.

(6) Make Microcapsules (S6)

As shown in a step S6 in FIG. 1, the electrophoretic solution is microencapsulated by applying publicly known techniques.

First, materials for coacervation, such as gelatin, gum arabic, sodium alginate, carrageenan, carboxymethylcellulose and agar for example, are dissolved in water. Next, the solution is agitated for a specific period of time, which is 30 to 300 minutes for example or more preferably 60 to 90 minutes. The temperature for agitation is set to room temperature to 60 degrees Celsius or more preferably 30 to 45 degrees Celsius. The agitation is performed at a rotational speed of 100 to 250 rpm, for example. After that, the rotational speed is gradually accelerated while dropping the electrophoretic solution made in the step S5. The average diameter of microcapsules is determined based on the rotational speed. After the rotational speed reaches the final speed that determines the average microcapsule diameter, the rotation is maintained for a specific period of time, which is approximately 30 minutes for example. Then, after decelerating the rotational speed to, for example, approximately 250 to 500 rpm, hot water (at approximately 40 to 45 degrees Celsius, for example) is added in an appropriate quantity and the rotation is continued for approximately 30 minutes.

Next, after adding an appropriate quantity of acetic acid to bring the PH of the solution to approximately 4, the solution is brought back to room temperature. Further, after cooling the solution temperature down to approximately 0 degrees Celsius by a specific method such as icing, etc., the temperature is maintained for approximately 1 to 2 hours. Next, an appropriate quantity of formalin solution for enhancing the strength of microcapsules is added, while maintaining the solution temperature. Further, another solution for adjusting alkalinity, such as approximately 10-percent sodium carbonate solution for example, is added in an appropriate quantity.

Then, after bringing back the solution temperature to room temperature, the solution is agitated for 1 to 12 hours. With the above step, a dispersion liquid containing microcapsules having an average diameter determined by the above-described rotational speed can be obtained. After sorting the microcapsules to unify the size, the final dispersion liquid is condensed through a funnel, etc., to make the slurry of microcapsules.

(7) Make Coating Liquid (S7)

As shown in a step S7 in FIG. 1, a coating liquid for applying the microcapsule slurry to a film is made. In order to make such a coating liquid, a binder is added to the slurry containing the above microcapsules at a rate of 30 to 80 percent. Then, the ingredients are mixed so as to make a uniformly mixed coating liquid. As such a binder, an emulsion binder can be used.

(8) Make Electrophoretic Film (S8)

As shown in a step S8 in FIG. 1, the coating liquid is applied onto a coating surface on which an electric field can be applied, in accordance with the type of a desired product. For example, the case of manufacturing a film-like electronic paper having flexibility will be described. First, a transparent electrode film is formed in the display area on a film that is formed of a specific flexible resin film such as PET, for example. As the material of such a transparent electrode film, ITO, etc. is used. Next, the transparent electrode film is patterned to form the pixel electrode of each pixel. On the patterned film, the coating liquid made in the above step is applied at a uniform thickness of, for example, 20 to 200 μm and dried for a specific time, which is 1 to 60 minutes for example, and at a specific temperature, which is room temperature to 150 degrees Celsius for example.

Further, as another electrode film that is provided facing the pixel electrode, another film that is entirely covered with a transparent electrode film is bonded so that the transparent electrode film faces the pixel electrode through the coating liquid. The bonding is performed using a laminator, for example.

On the electronic paper formed as above, a driver for supplying drive voltage between each pixel electrode and each common transparent electrode is provided. In such a configuration, when an electric field of a first direction is applied as the "on" state between the pixel electrode and the common transparent electrode, negatively charged dispersed particles migrate toward the positive electrode and positively charged, dispersed particles migrate toward the negative electrode. In the "off" state, an electric field of the opposite direction is applied.

FIG. 2 shows the configuration of an electronic paper as an electrophoretic device that displays images using microcapsules containing the above electrophoretic solution. As shown in FIG. 2, an electrophoretic device 10 has a plurality of scanning lines Va1 to Vam and a plurality of drive lines Vc1 to Vcn, which are wired in a display area 20, configuring an active-matrix drive circuit. In each pixel, a pixel-driving circuit G is provided. When both the scanning line Va and the drive line Vc are on, a pixel electrode PE reacts to have a positive potential with respect to a common electrode CE. In any state other than the above, the pixel electrode PE reacts to have a negative potential with respect to the common electrode CE. A driver 4 drives each of the scanning lines Va1 to Vam, and a driver 5 drives each of the drive lines Vc1 to Vcn. To the drivers 4 and 5, a display control circuit 3 is coupled. The display control circuit 3 provides drive information by determining the drive voltages of the scanning line Va and the drive line Vc based on an image supplied from, for example, a computer.

With the electrophoretic device 10 that is configured as described above, when image information of a specific character, line drawing, etc. is provided from a computer 2, the direction of the electric field between the pixel electrode PE and the common electrode CE changes according to the on/off information of each pixel. Therefore, particles dispersed in a microcapsule migrate according to the electric field and, according to the migration, the the kind of dispersed particles change. As a result, the color also changes, which enables the visual recognition of the information.

Figure 3A:
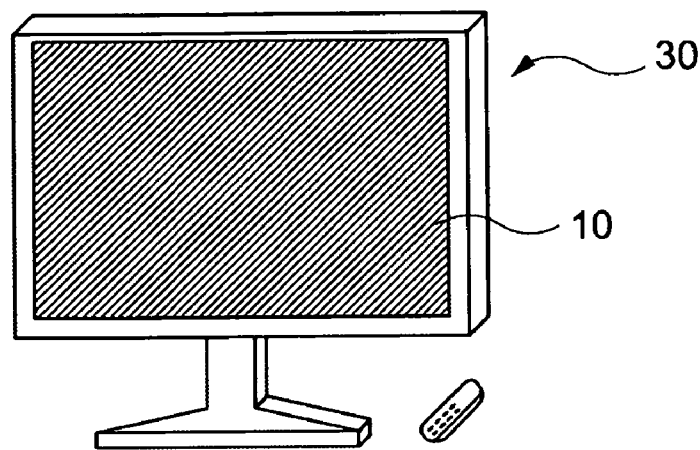
FIG. 3A is an example of an electrooptic device, which is a large-sized television device.
Figure 3B:
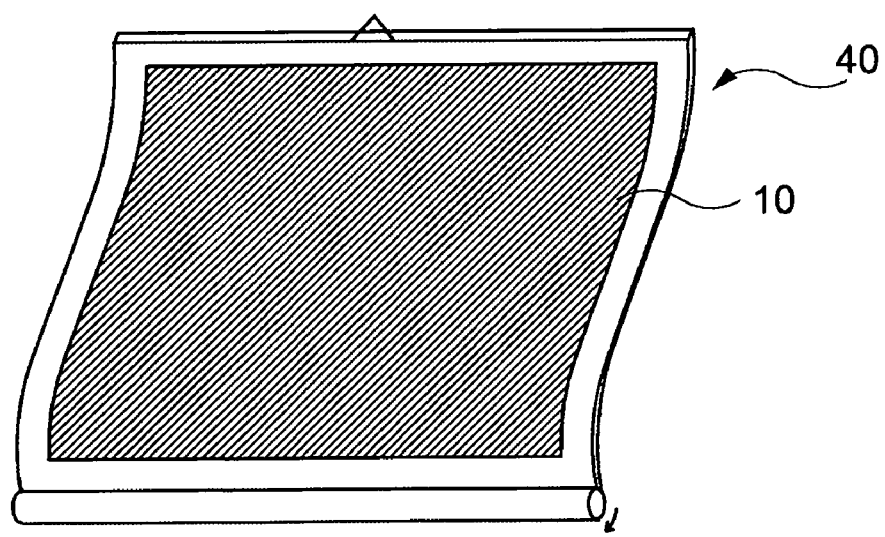
FIG. 3B is another example of an electrooptic device, which is a roll television device.

FIGS. 3A and 3B are examples of an electrooptic device (electronic device) to which the above electrophoretic device 10 is applied. FIG. 3A is an example of applying the electrophoretic device 10 to the display surface of a large-sized television device 30. FIG. 3B is another example of applying the electrophoretic device 10 to the display surface of a roll television device 40.

In addition, the scope of an electrooptic device applicable to the embodiment of the invention is not limited to the above devices but can only be a device having the above microcapsules on a substrate that configures the above active-matrix drive circuit. Further, the word "electrooptic device" widely includes devices using the visual change of colors accompanied by the migration of charged particles that is caused when an electric field is applied to charged particles such as titania particles, etc. in an electrophoretic solution. Other than the example devices described above, things that belong to real estate including walls, etc. and movable bodies including vehicles, flight vehicles, vessels, etc. that are configured so that an electric field can be applied to by applying a coating liquid are also included, for example.

WORKING EXAMPLE 1

In accordance with the above embodiment, the invention has been put into practice.

First, as the step S1, the surfaces of titania particles have been finished. 50 grams of CR-90 from Ishihara Sangyo Kaisha, Ltd. as titania particles, 110 grams of hexane as a solvent, and 3.5 grams of dimethyl-n-octylchlorosilane as a surface finishing agent have been put into a 500-milliliter three-neck flask and agitated at a solvent temperature of 55 degrees Celsius for approximately 4 hours. After that, centrifugal separation has been performed using a centrifuge to extract the surface-finished titania particles.

Next, as the step for removing unreacted agent (S2), the surface finishing agent having an unreacted group, etc. has been dissolved by adding an appropriate quantity of hexane to the titania particles, which has previously been put into a container, and agitating the contents. After the dissolution, the particles have been cleansed using a centrifuge again to remove the surface finishing agent, etc. having an unreacted group.

Next, as the step for dispersing a dispersion liquid (S3), after drying the titania particles obtained as above, 12.5 grams of the dried titania particles have been put into a 200-milliliter recovery flask and sealed after adding 90 milliliters of dodecylbenzene as a dispersion medium. Then, the contents has been mixed by agitating at 170 degrees Celsius for approximately 2 hours.

Further, as the step for promoting negative charging (S4), the particles have been agitated for 2 more hours by introducing air into the flask. With the above step, a dispersion medium wherein negatively charged titania particles are dispersed has been obtained.

Next, as the step for making an electrophoretic solution (S5), 40 grams of the dispersion liquid wherein the negatively charged titania particles are dispersed; 10 grams of acrylic particles that are colored red; and 40 grams of dodecylbenzene have been put into a 200 to 300-milliliter container and mixed while applying an ultrasonic wave and continuing agitation. The acrylic particles used are particles sizing 4 μm from Soken Chemical & Engineering Co., Ltd. By the above method, an electrophoretic solution wherein two different kinds of charged particles are dispersed has been completed.

Next, microcapsules have been made (S6).

Into a 500-milliliter beaker containing 60 milliliter of water, 4.5 grams of gum arabic and 4.5 grams of gelatin have been added and the contents have been dissolved. After the dissolution, the solution has been agitated and mixed at a solution temperature of 43 degrees Celsius and a rotational speed of 250 rpm for approximately 1 hour. The rotational speed has been gradually accelerated while dropping the above electrophoretic solution into the mixed solution. The final rotational speed has been set to 1000 rpm. After the rotational speed has reached the final speed, the rotation has been maintained for 30 minutes. After the 30-minute rotation, the rotational speed has been decelerated to 450 rpm and, with the addition of approximately 300 milliliter of water that is heated to 45 degrees Celsius and 1.5 milliliter of approximately 10-percent sodium carbonate solution so as to make the entire solution into weak alkaline, the agitation has been continued for approximately 30 minutes. After the approximately 30-minute agitation, with the gradual addition of 11 milliliter of 10-percent acetic acid solution, the mixed liquid has eventually been made into an acid solution of pH approximately 4. After the addition of the acetic acid solution, the mixed liquid has been cooled down to room temperature and further cooled with ice maintaining the liquid temperature at approximately 0 degree Celsius for approximately 1 hour. After maintaining for 1 hour, 2.5 milliliter of formalin solution and 20 milliliter of 10-percent sodium carbonate solution have been added, maintaining the liquid temperature. After adding the above solutions, the liquid has been brought back to room temperature and agitated for approximately 12 hours. After the 12-hour agitation, the dispersion liquid obtained including microcapsules has been sifted to extract a dispersion liquid including microcapsules according to microcapsule diameters. The microcapsule dispersion liquid contains microcapsules sizing 30 to 60 μm.

As the step for making a coating liquid (S7), the sorted microcapsule dispersion liquid has been filtered to make a slurry containing the microcapsules at a rate of 60 percent. Into the slurry, POLON-MF-40 from Shin-Etsu Chemical Co., Ltd. has been mixed as an emulsion binder so as to make a coating liquid.

Next, as the step for making an electrophoretic film (S8), the coating liquid has been applied on a PET film, on which pixel electrodes are formed using ITO, so that there is no overlap of microcapsules but a single-microcapsule layer of a uniform microcapsule density. After the application, the coating liquid has been dried at 90 degrees Celsius for 20 minutes. Onto the microcapsule layer obtained as described above, another PET film that is entirely covered with ITO thin film has been overlaid and bonded using a laminator.

When a voltage of 30 V has been applied to the electrodes facing each other on the film formed in the above working example, a preferable electrode pattern has been displayed in accordance with the presence of voltage applied.

The entire disclosure of Japanese Patent Application No. 2005-049299, filed Feb. 24, 2005 is expressly incorporated by reference herein.

What is claimed is:

1. A charged particle comprising:
a titanium oxide particle; and
a composition including one reactive group, the reactive group being bonded to the titanium oxide particle, the composition including R1, R2 and R3 as alkyl groups and Cl, the C1 being a substituent in order to bond the titanium and the composition, the composition being in a chemical formula below.

Chemical formula 2:

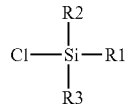

2. An electrophoretic device including a disperse medium and the charged particle according to claim 1, the charged particle being dispersed in the disperse medium.

3. An electro-optical device having the electrophoretic device according to claim 2.

4. A method of forming a microcapsule comprising:
forming a charged particle by bonding a plurality of compositions to a titanium oxide particle, each of the plurality of the compositions including one reactive group as a substituent, the composition including R1, R2 and R3 as alkyl groups and Cl, the Cl being a substituent in order to bond the titanium and the composition, the composition being in a chemical formula below;
forming a dispersion by adding the charged particle to a disperse medium; and
forming a microcapsule by covering the dispersion with a capsule.

Chemical formula 4:

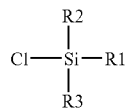

5. The method according to claim 4, further comprising:
adding the charged particle to a solution, the solution dissolving a unreacted composition that has an unreacted group to remove the unreacted composition from a surface of the charged particle.

6. The method according to claim 4, further comprising:
introducing an air to the disperse medium and heating the disperse medium.

7. The method according to claim 4, a surface finishing agent including the composition, the surface finishing agent being any one coupling agent that is selected from a group including: a silane series coupling agent, a titanate series coupling agent, a chromium series coupling agent, an aluminum series coupling agent and a germanium series coupling agent.

* * * * *